US007149599B2

(12) United States Patent
Arai et al.

(10) Patent No.: US 7,149,599 B2
(45) Date of Patent: Dec. 12, 2006

(54) APPARATUS AND METHOD FOR CREATING TOOL PATH

(75) Inventors: Hiroshi Arai, Hitachiota (JP); Junichi Hirai, Hitachi (JP); Tamotsu Harihara, Fujisawa (JP); Osamu Chiba, Hitachinaka (JP); Nobuhisa Kanamaru, Hitachi (JP); Shunsuke Minami, Mito (JP)

(73) Assignees: Hitachi, Ltd., Tokyo (JP); Hitachi Software Engineering Co., Ltd., Yokohama (JP)

( * ) Notice: Subject to any disclaimer, the term of this patent is extended or adjusted under 35 U.S.C. 154(b) by 0 days.

(21) Appl. No.: 11/066,396

(22) Filed: Feb. 28, 2005

(65) Prior Publication Data
US 2005/0143855 A1 Jun. 30, 2005

Related U.S. Application Data

(63) Continuation of application No. 10/323,880, filed on Dec. 20, 2002, now abandoned.

(30) Foreign Application Priority Data
Dec. 25, 2001 (JP) ............................. 2001-392562

(51) Int. Cl.
G06F 19/00 (2006.01)
(52) U.S. Cl. ..................................... 700/186
(58) Field of Classification Search ........ 700/180–184, 700/186–189
See application file for complete search history.

(56) References Cited
U.S. PATENT DOCUMENTS

| 4,130,788 A | 12/1978 | Fiegehen et al. |
| 4,387,327 A | 6/1983 | Kralowetz et al. |
| 4,445,182 A | 4/1984 | Morita et al. |
| 4,559,601 A | 12/1985 | Kishi et al. |
| 4,905,158 A | 2/1990 | Seki et al. |
| 4,961,150 A | 10/1990 | Seki et al. |
| 5,006,999 A * | 4/1991 | Kuno et al. ............ 700/253 |
| 5,070,464 A | 12/1991 | Seki et al. |
| 5,095,440 A * | 3/1992 | Suzuki et al. ............ 700/191 |
| 5,157,598 A * | 10/1992 | Seki et al. ............... 700/86 |
| 5,198,984 A | 3/1993 | Yamaguchi et al. |
| 5,305,228 A | 4/1994 | Seki et al. |

(Continued)

FOREIGN PATENT DOCUMENTS

EP 1184761 A2 * 3/2002

(Continued)

OTHER PUBLICATIONS

European Patent Office, European Search Report, dated Feb. 1, 2005.

(Continued)

Primary Examiner—Maria N. Von Buhr
(74) Attorney, Agent, or Firm—McDermott Will & Emery LLP

(57) ABSTRACT

When creating other tool path from two tool paths for cutting a work accurately and efficiently, the data on the first tool path is composed of a position vector and a direction vector of a tool for use when the work is cut while moving the tool. The data on the second tool path is composed of a position vector and a direction vector of the tool for use when the work, which has been cut according to the first tool path, is further cut. A computer uses the first tool path data and second tool path data to calculate a position vector and a direction vector of a medium tool path that is between the first tool path and second tool path.

3 Claims, 13 Drawing Sheets

U.S. PATENT DOCUMENTS

| | | | |
|---|---|---|---|
| 5,327,057 A * | 7/1994 | Kishi et al. | 318/568.11 |
| 5,347,461 A | 9/1994 | Song et al. | |
| 5,363,309 A | 11/1994 | Tog Loh | |
| 5,532,933 A | 7/1996 | Nakata | |
| 5,761,390 A | 6/1998 | Koshishiba et al. | |
| 5,815,400 A * | 9/1998 | Hirai et al. | 700/173 |
| 5,884,682 A | 3/1999 | Kennedy et al. | |
| 5,923,132 A | 7/1999 | Boyer | |
| 5,923,561 A * | 7/1999 | Higasayama et al. | 700/186 |
| 6,298,279 B1 | 10/2001 | Shimada et al. | |
| 6,311,098 B1 | 10/2001 | Higasayama et al. | |
| 6,363,298 B1 * | 3/2002 | Shin et al. | 700/160 |
| 6,587,747 B1 * | 7/2003 | Hirai et al. | 700/189 |
| 6,675,061 B1 | 1/2004 | Hirai et al. | |
| 6,718,854 B1 * | 4/2004 | Bedi et al. | 82/118 |
| 2002/0025758 A1 * | 2/2002 | Sei et al. | 451/5 |

FOREIGN PATENT DOCUMENTS

| | | | |
|---|---|---|---|
| JP | 04310349 A | 11/1992 | |
| JP | 10-307615 A | 11/1998 | |

OTHER PUBLICATIONS

"Die Technology" (vol. 13, No. 9, The Nikkan Kougyo Shimbun Ltd), pp. 27-31, 1998.

"On the Computational Geometry of Pocket Machining" (M. Held, Springer-Verlag Berlin Heidelberg, 1991, printed in Germany) pp. 17-36.

"Bit separate Volume Computer Science, acm Computing Surveys' 91", pp. 131-185.

"A Manufacturing Process Drafting in SUPOG: Support System for Drawing Operation-Guide-Document" (collected papers (V) for the 72nd national convention of the Japan Society of Mechanical Engineers), pp. 316-318, 1994.

"Research on an Algorith for Automatic Finite Element Mesh Generation Related to the Geometric Model" (No. 484, vol. C of collected papers of The Japan Society of Mechanical Engineers, Dec. 186), pp. 3224-3226.

"The NURBS Book 2nd Edition" (Les Piegl, Wayne Tiller, Springer-Verlag Berlin Heidelberg, 1995 and 1997, printed in Germany) pp. 457-471.

* cited by examiner

APPARATUS AND METHOD FOR CREATING TOOL PATH

RELATED APPLICATIONS

This application is a continuation of U.S. patent application Ser. No. 10/323,880, filed Dec. 20, 2002 now abandoned, which claims priority of Japanese Patent Application No. 2001-392562, filed Dec. 25, 2001, which is incorporated herein by reference.

BACKGROUND OF THE INVENTION

The present invention relates to a tool path creation apparatus such as a CAM (Computer Aided Manufacturing) system, and more particularly to a tool path creation apparatus suitable for rough cutting for cutting a work into a shape to be used for finish cutting.

In conventional rough cutting, less than 3 axis milling has been mainly used as described in "Die Technology" (Vol. 13, No. 9, THE NIKKAN KOUGYO SHIMBUN LTD), pp. 27–31 (hereinafter called Reference 1). Reference 1 describes some methods for rough cutting. In one method, surface data on the work shape and the finishing shape is input to create straight lines from the work surface to the finished surface and then drills are used for boring. In another method, the cross sections from the work surface to the finished surface are created and a tool path that is the offset of the inner or outer cross section curve is used. In still another method, those two methods are combined. Reference 1 also discloses that a rapid change in the cutting path direction, sometimes caused during rough cutting depending upon the shape, may damage the tool. The method for creating intermediate cross section curves from the outer and inner cross section curves is described on pages 17–36 in "On the Computational Geometry of Pocket Machining" (M. Held, Springer-Verlag Berlin Heidelberg, 1991, Printed in Germany) (hereinafter called Reference 2). Reference 2 describes some methods for creating intermediate cross section curves. In one method, the outer and inner cross section curves are offset and the intermediate cross section curves are created with the auto-crossing curves in the cutting path direction removed. In another method, the power diagram (voronoi diagram) of the outer and inner cross section curves are used to create intermediate cross section curves. For the voronoi diagram, the basic concept and the processing on a computer are described on pages 131–185 in "Bit separate Volume Computer Science, acm Computing Surveys' 91".

Another method for rough cutting is that the difference between the work shape and the finishing shape is used to represent an intermediate shape and, from this intermediate shape, the cutting data is created. For example, a method for creating the intermediate shape of a rotary object from the difference between the work solid shape and the finished solid shape to create a rotary shape for use in cutting is described on pages 316–318 in "A Manufacturing Process Drafting in SUPOG: Support System for Drawing Operation-Guide-Document" (collected papers (V) for the 72nd national convention of The Japan Society of Mechanical Engineers).

In addition, the creation of a solid body by interpolating a surface is described on pages 3224–3226 in "Research on an Algorith for Automatic Finite Element Mesh Generation Related to the Geometric Model" (No. 484, Volume C of collected papers of The Japan Society of Mechanical Engineers, December, 1986). The creation of a skinned surface is described on pages 457–471 in "The NURBS Book 2nd Edition" (Les Piegl, Wayne Tiller, Springer-Verlag Berlin Heidelberg, 1995 and 1997, printed in Germany) (hereinafter called Reference 3).

On the other hand, it is easy for a tool-path creating CAM using more than 4 axis milling (hereinafter called a multi axis CAM) to create a tool path for cutting into a work shape and to create a tool path for cutting into a finishing shape. A multi axis CAM can output a tool path into a file in a standard format of APT (Automatically Programmed Tools: developed in 1995 by Massachusetts Institute of Technology of United States).

SUMMARY OF THE INVENTION

The problem with the rough cutting method described in Reference 1, which is basically less than 3 axis milling, is that there is the rest of cutting and that the cutting feed rate is low.

Also, the method for representing a medium shape using the difference between the work shape and the finishing shape requires long working hours in multi axis CAM. This is because a solid body representing the medium shape is created first with CAD (Computer Aided Design), a plurality of surfaces are extracted from the solid body, and then the tool leading-edge position vector and the tool main axis direction vector are created for each surface using multi axis CAM.

On the other hand, the method for creating a work shape and a finishing shape using CAD to create a tool path (cutter location) with multi axis CAM can reduce the rest of cutting in the work shape and the finishing shape and increase the cutting feed rate. However, this method cannot create a tool path for rough cutting.

The advantage of the present invention is to provide an apparatus for creating, from two tool paths, another tool path for very accurate and high efficiency cutting.

According to one embodiment of the present invention, there is provided a tool path creation apparatus comprising a memory unit for storing first tool path data indicating a position and a direction of a tool when a work is cut while moving the tool and second tool path data indicating the position and the direction of the tool when, after cutting the work according to the first tool path, the work is further cut while moving the tool; and means for creating, based on the first and second tool path data, N-stage (N is a natural number) third tool path data indicating the position and the direction of the tool for cutting the work, each of the N-stage third tool path data being data on a tool path between the first tool path and the second tool path.

In a preferred embodiment, the first and second tool path data each contains a plurality of pairs of a position indicating a moving path of the tool and a direction of the tool at the position. The tool path creation apparatus further comprises means for making adjustment so that a number of the pairs included in the first tool path data becomes equal to a number of the pairs included in the second tool path data, wherein the means for creation uses a first tool path pair sand a second tool path pair, which correspond each other, to create a third tool path pair of the position of a moving path of the tool and the direction of the tool at the position.

In a preferred embodiment, the pairs included in the first, second, and third tool path data each comprise a position vector and a direction vector, and the means for creation establishes the direction vector of an ith($1 \leq i \leq N$) third tool path into a direction determined by dividing a difference between the position vector of the first tool path and the position vector of the second tool path into a ratio i:N+1−i.

Other objects, features and advantages of the invention will become apparent from the following description of the embodiments of the invention taken in conjunction with the accompanying drawings.

DETAILED DESCRIPTION OF THE EMBODIMENTS

Figure 1:
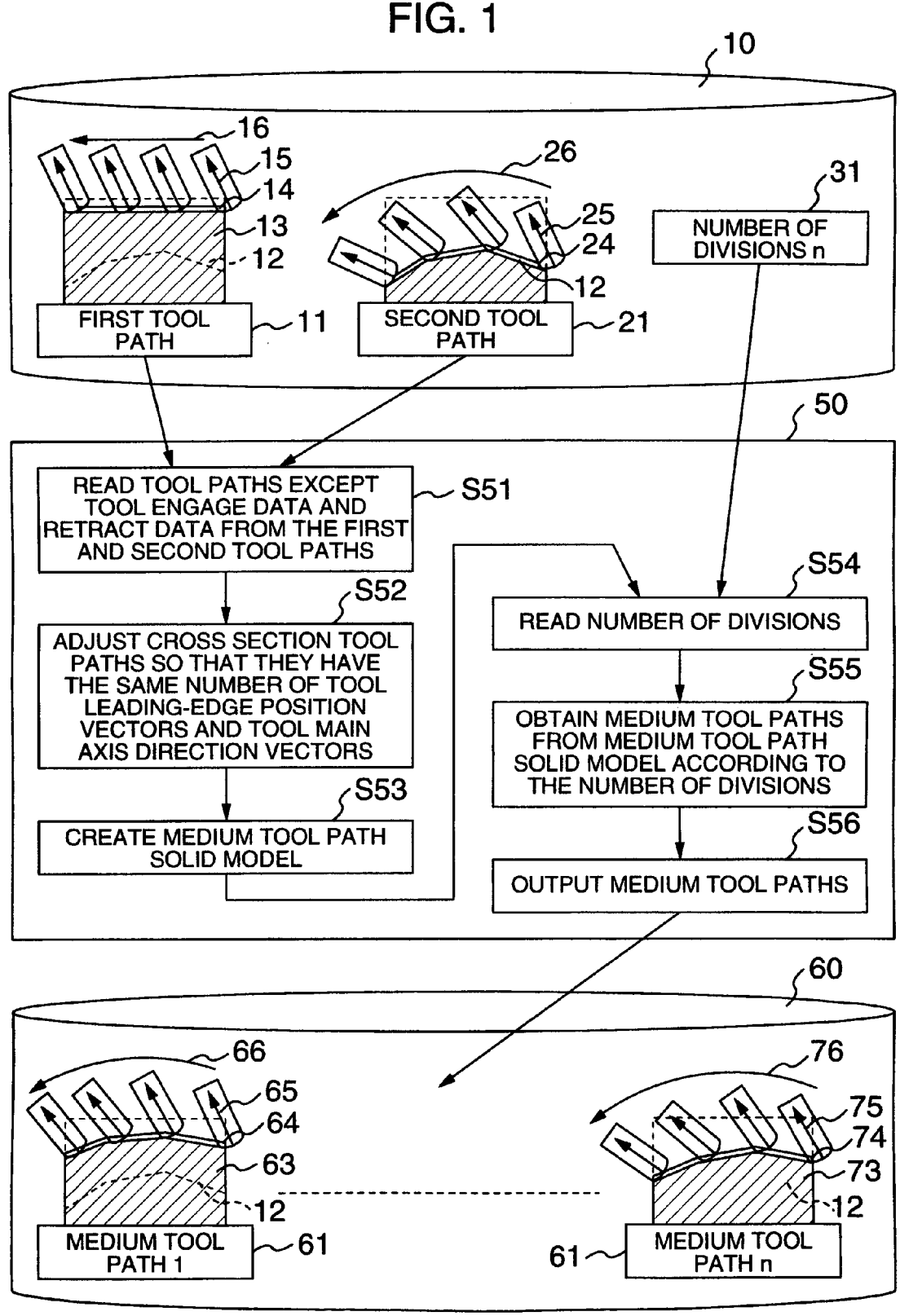
FIG. 1 is a block diagram showing the overview of a tool path creation apparatus in a first embodiment of the present invention.

Some embodiments of the present invention will be described with reference to the drawings. In the drawings, the following reference numerals are used frequently: 10 . . . External file, 11 . . . First tool path, 21 . . . Second tool path, 31 . . . Number of divisions, 50 . . . Computer in the tool path creation apparatus, 60 . . . External file, 61 . . . Medium tool path, 70 . . . Tool path data generation company system, and 75 . . . CAD/CAM data generation company system.

FIG. 1 shows the overview of a tool path creation apparatus in one embodiment of the present invention. In this tool path creation apparatus, the computer 50 reads data from the external file 10, executes steps S51–S56 to generate medium tool path data, and stores the output data in the file 60.

In the external file 10 of the computer 50, data on the first tool path 11, second tool path 21, and number of divisions 31 received from the host computer is stored. The data on the first tool path 11 is composed of two vectors in the coordinate system (work coordinate system) in which a surface shape is defined: a tool leading-edge position vector (hereinafter simply called a position vector) Vp 14 that indicates the position of a tool and a tool main-axis direction vector (hereinafter simply called a direction vector) Vd 15 that indicates the direction of the tool. The first tool path 11 is calculated for a cutting path direction 16 to cut a work 13. Data on the second tool path 21 is composed of two vectors calculated for a cutting path direction 26 to cut into a finishing shape 12: a position vector Vp 24 and a direction vector Vd 25. The number of divisions 31 determines the number of medium tool paths (third tool path) between the first tool path and the second tool path.

Figure 2:
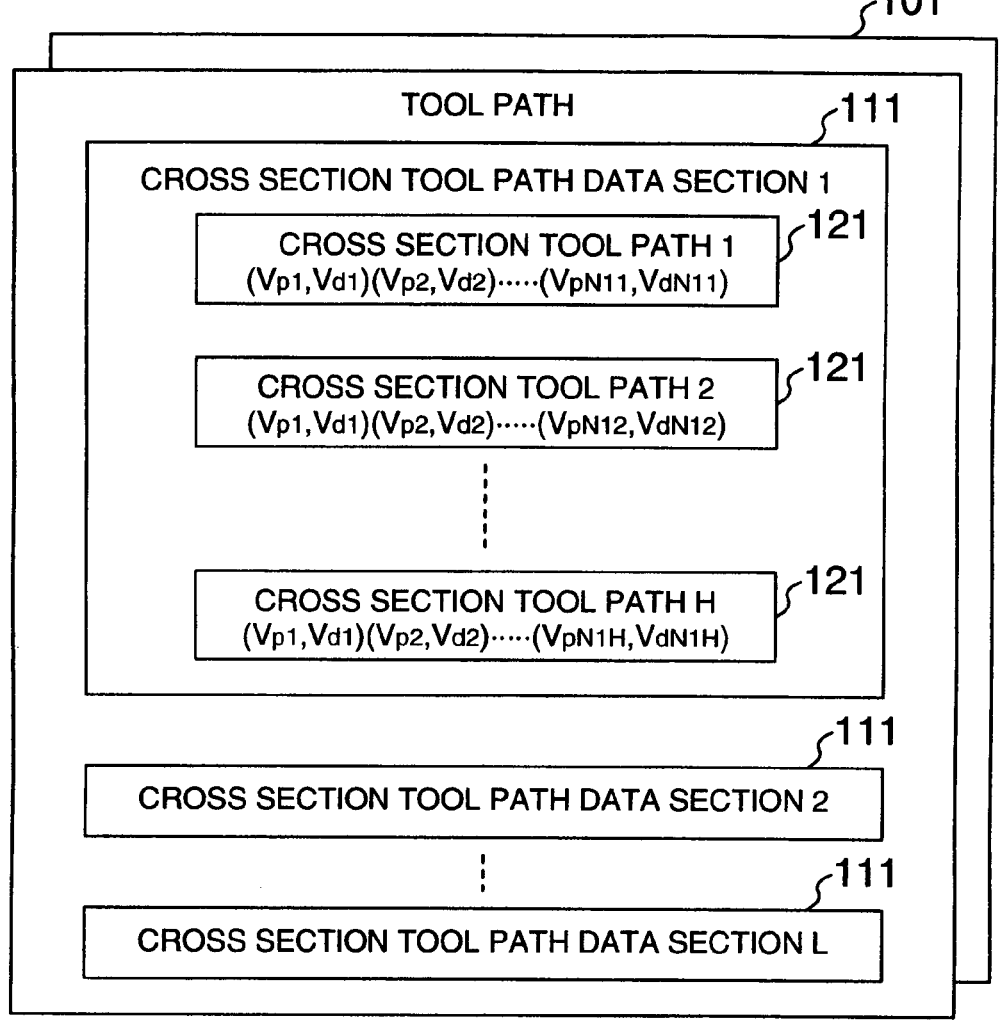
FIG. 2 is a diagram showing an example of the structure of tool path data.

Now, referring to FIG. 2, the following describes the data structure of a tool path (including the first and second tool paths). A tool path 101 is composed of one or more cross section tool path data sections 111 (L groups in this example). Each cross section tool path data section 111 is composed of one or more cross section tool paths 121 (H paths in this example). Each cross section tool path 121 includes a plurality of pairs each composed of the position vector Vp and the direction vector Vd. In the example shown in FIG. 2, the cross section tool paths 121 have N11 to NLH vector pairs (Vp, Vd). The position vector Vp has the value of (Cx, Cy, Cz) in the (x, y, z) directions, and the direction vector Vd has the value of (Dx, Dy, Dz) in the (x, y, z) directions. The cross section tool path 121 has three types of data, tool engage data, cutting data, and retract data, as will be described below.

The data structure described above may be stored in an APT format file, ASCII format file, or binary format file.

Figure 3:
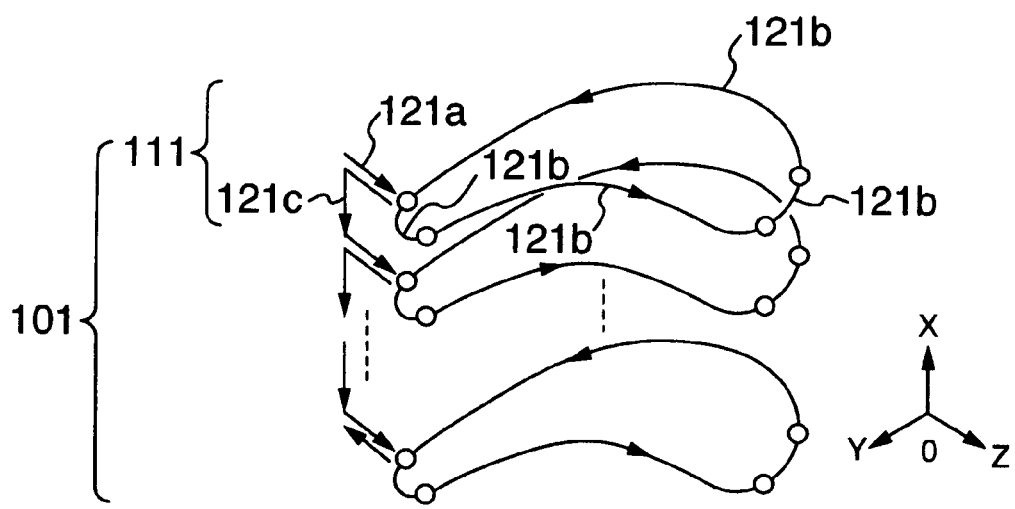
FIG. 3 is a diagram showing an image of a round type tool path.

FIG. 3 shows the image of an example of a round type tool path using the tool path data shown in FIG. 2. This figure is a line chart showing the location of the position vector Vp. For convenience, the direction vector Vd is not shown. The tool path 101 is composed of a plurality of cross section tool path data sections 111. The cross section tool path data section 111 is composed of a cross section tool path 121a indicating the tool engage data, four cross section tool paths 121b indicating cutting data, and a cross section tool path 121c indicating the retract data. The tool moves sequentially in the direction indicated by the arrows.

Returning to FIG. 1, the following describes the processing of the computer 50. The computer 50 is, for example, a general-purpose computer system with the CPU, main storage unit, and other components. The functions described below may be implemented, for example, by reading a computer program.

The computer 50 reads the first tool path 11 and the second tool path 21 from the external file 10 in step S51. At this time, the computer 50 does not read the tool engage data and the retract data included in the first tool path 11 and the second tool path 21. That is, the computer 50 skips the tool engage data and the retract data and reads the cutting data only. The tool engage data and the retract data are identified, for example, by the fact that the first and the last cross section tool paths 121 (121a and 121c) in the cross section tool path data section 111 shown in FIG. 2 correspond to the tool engage data and the retract data respectively. Alternatively, for each cross section tool path 121, data identifying the tool engage data, retract data, and cutting data may be added to the data structure in FIG. 2 determine the path type.

In the processing described below, only the cutting data of the first tool path 11 and the second tool path 21 are processed.

Figure 4:
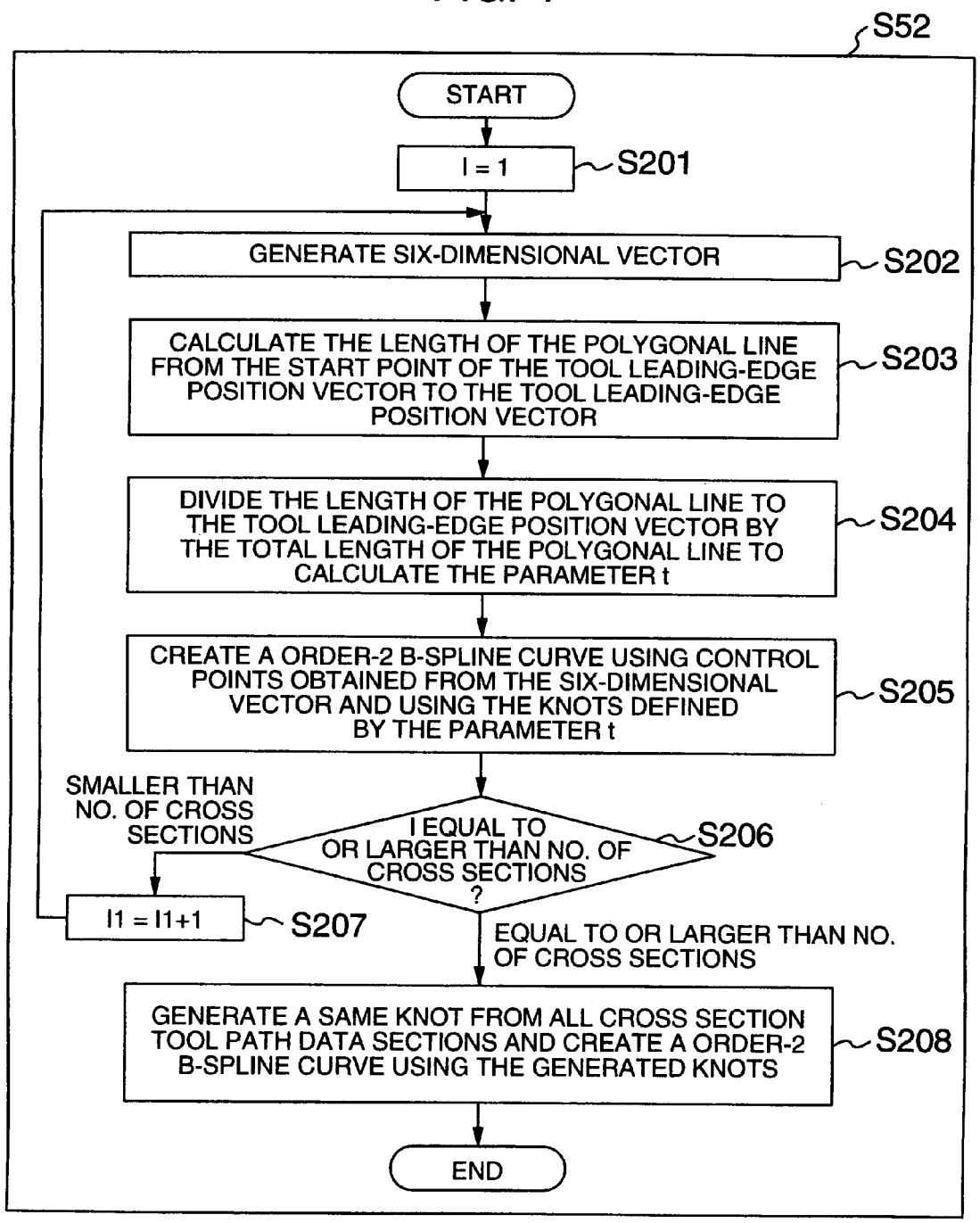
FIG. 4 is a flowchart showing an example of processing executed to allow all cross section tool paths to have the same number of pairs of a position vector and a direction vector.

Next, in step S52, the computer 50 adjusts the number of pairs, each composed of the position vector Vp and the direction vector Vd, included in each unit of cutting data so that a plurality of units of cutting data (including a plurality of pairs of position vector Vp and direction vector Vd), which have already been read, have the same number of pairs. FIG. 4 shows the detailed processing procedure for executing step S52.

First, the index I is set to 1 before performing the following processing for all cross section tool path data sections 111 that have been read (S201).

For each of the first tool path 11 and the second tool path 21 in the Ith cross section tool path data section 111, a six-dimensional vector Q shown in expression (1) is generated (S202).

Expression 1

$$Q_{i,j,k,1} = \begin{bmatrix} C_{x,i,j,k,1} \\ C_{y,i,j,k,1} \\ C_{z,i,j,k,1} \\ D_{x,i,j,k,1} \\ D_{y,i,j,k,1} \\ D_{z,i,j,k,1} \end{bmatrix} \quad (1)$$

where, Q is a vector with six components that represent the position vector Vp and the direction vector Vd. C represents the (x, y, z) component of the position vector Vp, and D represents the (x, y, z) component of the direction vector Vd. The index i, which is a variable identifying the first tool path 11 or the second tool path 21, varies from 1 to 2 in this embodiment. The index j is a variable identifying one of cross section tool path data sections 1–L, the index k is a variable identifying one of cross section tool paths 1–H, and the index l is a variable identifying the position vector Vp1k–NLk and direction vector Vd1k–NLk.

After creating the six-dimensional vector Q, expression (2) is used to calculate the polygonal line length A from the start point of the position vector Vp to each position vector Vp (S203).

Expression 2

$$A_{i,j,k,1} = \sum_{l=1}^{NLk-1} \begin{bmatrix} C_{x,i,j,k,l+1} - C_{x,i,j,k,l} \\ C_{y,i,j,k,l+1} - C_{y,i,j,k,l} \\ C_{z,i,j,k,l+1} - C_{z,i,j,k,l} \end{bmatrix} \quad (2)$$

Where, the indexes i, j, k, and l are the same as those in expression (1).

After calculating the length to the position vector Vp, expression (3) is used to calculate the parameter t (S204). Expression (3) means the division of the length to the position vector Vp by the length of the cross section tool path.

Expression 3

$$t_{i,j,k,1} = \frac{A_{i,j,k,1}}{A_{i,j,k,NLk-1}} \quad (3)$$

Next, with the points defined by the position vector Vp and the direction vector Vd as the control points, the order-2 B-spline curve P is created by arranging two knots for the start (l=1) of the parameter t and two knots for the parameter t (l=2–NLK–2) and the end of parameter t(l=NLK–1). In this way, the B-spline curve is created from the polygonal line (S205).

The method is described, for example, in Reference 3. Expression (4) shows the definition expression of a order-2 B-spline curve P created in this way.

Expression 4

$$P_{i,j,k(u)} = \frac{\sum_{l=1}^{NLk-1} N_{1,2(u)} W_{i,j,k,l} Q_{i,j,k,l}}{\sum_{l=1}^{NLk-1} N_{1,2(u)} W_{i,j,k,l}} \quad (4)$$

In expression (4), P is a order-2 B-spline curve representing the cross section tool path, N is a B-spline function value, W is a weight, Q is a control point, and u is a variable for creating a point on the B-spline curve. For the sake of simplicity, the weight W is always 1 in this embodiment. When using a curve (such as an arc) using a trigonometric function, the weight W is set according to the rational curve of the trigonometric function. The indexes i, j, k, and l are the same as those in expression (1).

If I is smaller than the number of cross section tool path data sections 111, I is incremented by 1 and control is passed back to S202 to repeat processing (S206, S207). If I is equal to or greater than the number of cross section tool path data sections 111, control is passed to step S208. That is, at the time control is passed to this processing step, the B-spline curve is created for all cross section tool path data sections.

The knots are taken out from the B-spline curves of all cross section tool path data sections 111, the common values are removed, and the knots are re-sequenced to create a same knot. Then, a B-spline curve using the same knot is created with the original B-spline curve shape unchanged (S208). This processing, called a knot insertion algorithm, is described, for example, in Reference 3.

Because all the cross section tool path data sections 111 have the same number of control points after step S208 ends, all the cross section tool path data sections 111 have the same number of pairs of the position vector Vp and the direction vector Vd.

Figure 5:
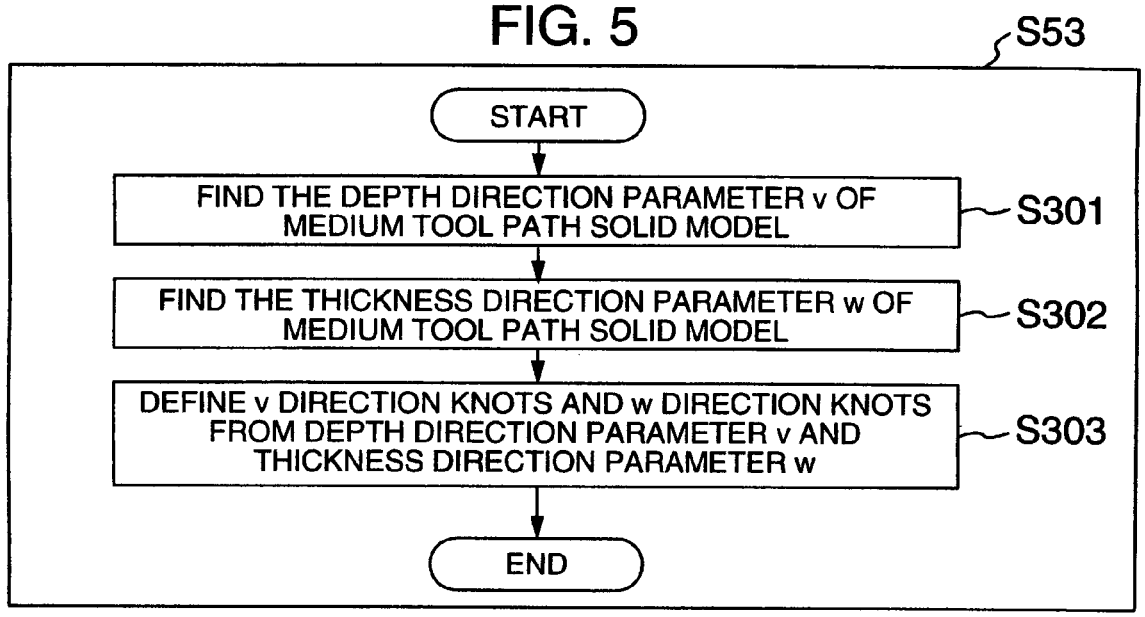
FIG. 5 is a flowchart showing an example in which a medium tool path solid model is created

Next, in step S53, the computer 50 creates a medium tool path solid model between the first tool path 11 and the second tool path 21. FIG. 5 shows the detailed processing procedure of step S53.

First, the number L of all cross section tool path data sections 111 is obtained, and (number of cross section tool path data section –1) is divided by (L–1) to find the depth direction parameter v of the medium tool path solid model (S301). Next, the thickness direction parameter w is set to 0 for the first tool path, and to 1 for the second tool path (S302). Then, from the depth direction parameter v and the thickness direction parameter w, the v direction and w direction knots are set (S303). The v direction and the w direction knots are set, for example, by creating u direction knots in step S205. Expression (5) shows an example in which a medium tool path solid model is described by the B-spline solid R.

Expression 5

$$R(u, v, w) = \frac{\sum_{i=1}^{2}\sum_{j=1}^{L}\sum_{l=1}^{NLk-1} N_{1,2(u)}N_{j,2(v)}N_{i,2(w)}W_{i,j,k,l}Q_{i,j,k,l}}{\sum_{i=1}^{2}\sum_{j=1}^{L}\sum_{l=1}^{NLk-1} N_{1,2(u)}N_{j,2(v)}N_{i,2(w)}W_{i,j,k,l}} \quad (5)$$

After step S53, the computer 50 reads the number of divisions 31 from the external file 10 to determine the number of medium tool paths in step S54.

Figure 6:
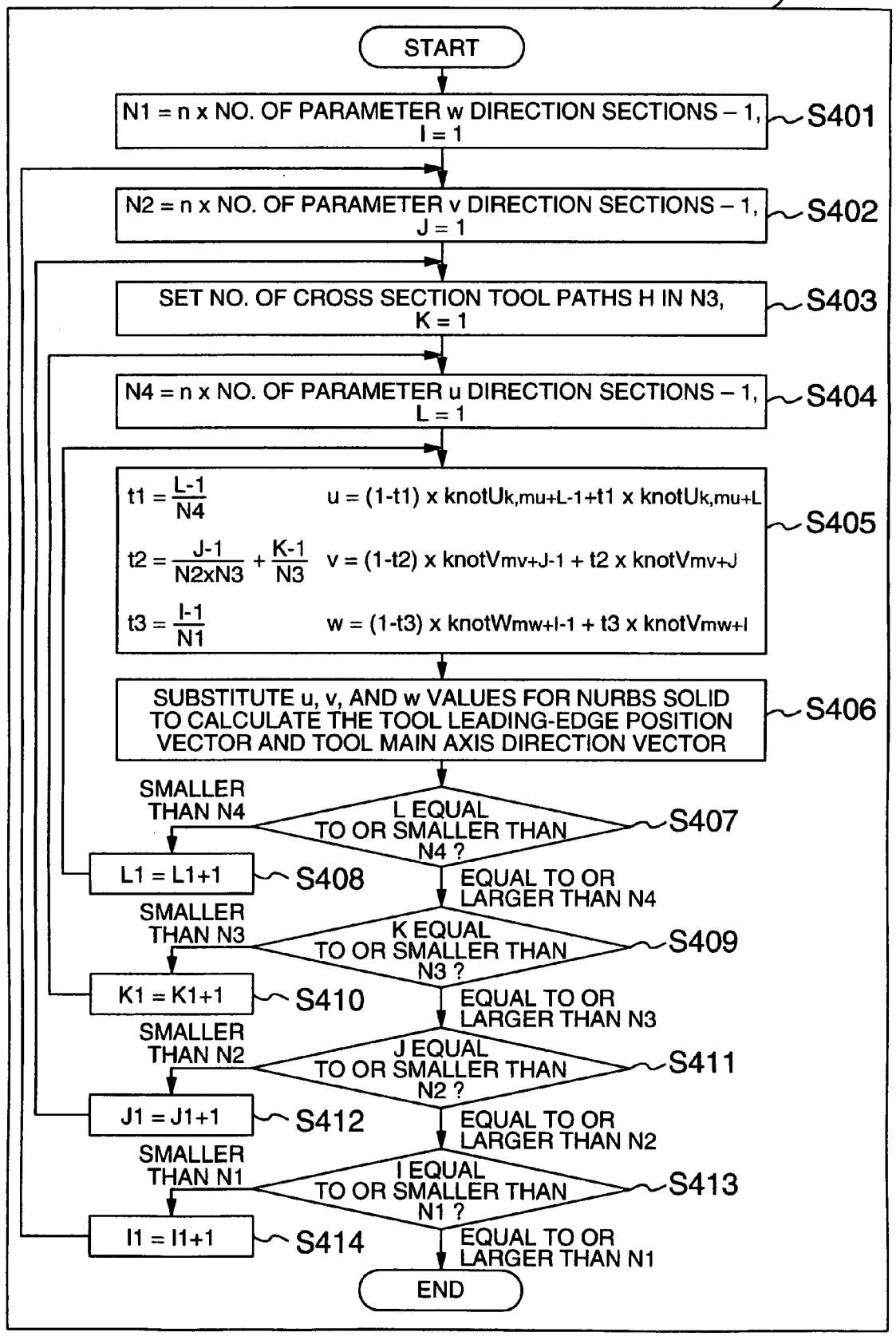
FIG. 6 is a flowchart showing an example in which medium tool path data is created from a medium tool path solid model according to the number of divisions.

The computer 50 uses a number of divisions 31 (n in this example), which has been read, to divide the medium tool path solid model in step 55 to calculate n medium tool paths 61. FIG. 6 shows the detailed processing procedure for calculating medium tool paths 61.

A point in the medium tool path solid model R may be obtained by specifying the parameter (u, v, w) of expression (5). FIG. 6 shows an example of processing in which the parameter (u, v, w) of expression (5) varies according to the number of divisions n. The processing steps in FIG. 6 calculate the medium tool paths, which will be generated between the first tool path and the second tool path, by dividing the interval between the neighboring knot values in the u direction, v direction, and w direction of the medium tool path solid model by the number of divisions n. The processing steps create tool paths, each at an interval smaller than that between the first tool path and the second tool path, to make the miss cutting amount at least smaller than that generated by the first tool path and the second tool path.

First, the number of medium tool paths N1 to be created in the parameter w direction of expression (5) is created, and the index I identifying a medium tool path to be created in the parameter w direction is set to 1 (S401). The number of medium tool paths, N1, is created by expression (6) as follows.

$$N1 = n \times B - 1 \quad (6)$$

In expression (6), n is the number of divisions 31 and B is the number of sections in the parameter direction. The number of sections is determined by (number of control points of parameter direction—order of parameter direction +1). Because the number of control points of the parameter direction is determined by (number of knots of parameter direction)—(order of parameter direction) when the B-spline curve is used, the number of sections may be determined by (number of knots of parameter direction)—(order of parameter direction)×2+1.

When there are multiple knots on the B-spline curve knots (multiplexed), a section of width 0 may be included in the number of sections. Therefore, a check is made if the section width is 0 and, if it is 0, processing is not performed to prevent the same value from being generated. The method of determining the number of sections like this is described, for example, in Reference 3.

After step S401, steps S402–S412 are executed and, in step S413, a check is made if the index I is equal to or smaller than the number of medium tool paths in the parameter w direction (N1). If I is smaller than N1, I is incremented by 1 in step S414 and control is passed to step S402 to repeat processing. If I is equal to or larger than N1, processing is terminated. The steps described above create N1 medium tool paths in the parameter w direction of expression (5).

Next, the same processing as that described above is executed for the parameter v direction in expression (5). That is, the number of medium tool paths to be created in the parameter v direction (N2) is created, and the index J identifying a medium tool path to be created in the parameter v direction is set to 1 (S402). N1 in expression (6) is changed to N2 for the number of medium tool paths N2.

After step S402, steps S403–S410 are executed and, in step S411, a check is made if the index J is equal to or smaller than the number of medium tool paths in the parameter w direction (N2). If J is smaller than N2, J is incremented by 1 in step S412 and control is passed to step S403 to repeat processing. If J is equal to or larger than N2, control is passed to step S413. The steps described above create N2 medium tool paths in the parameter v direction of expression (5).

Next, the number of cross section tool paths 121 (H) in the cross section tool path data section 111 in the parameter u direction is set to N3, and the index K identifying the cross section tool path 121 is set to 1 (S403).

After step S403, steps S404–S408 are executed and, in step S409, a check is made if the index K is equal to or larger than the number of cross section tool paths in the parameter u direction (N3). If K is smaller than N3, K is incremented by 1 in step S410 and control is passed to step S404 to repeat processing. If K is equal to or larger than N3, control is passed to step S411. The steps described above create medium tool paths corresponding to the cross section tool paths in the cross section tool path data section in the parameter u direction.

Next, the same processing as that described above is executed for the parameter u direction in expression (5). That is, the number of medium tool paths to be created in the parameter u direction (N4) in expression (5) is created, and the index L identifying a medium tool path to be created in the parameter u direction is set to 1 (S404). N1 in expression (6) is changed to N4 for the number of medium tool paths N4.

After step S404, steps S405–S406 are executed and, in step S407, a check is made if the index L is equal to or larger than the number of medium tool paths in the parameter u direction (N4). If L is smaller than N4, L is incremented by 1 in step S408 and control is passed to step S405 to repeat processing. If L is equal to or larger than N4, control is passed to step S409. The steps described above create N4 medium tool paths in the parameter u direction in expression (5).

Next, the parameter (u, v, w) in expression (5) is created (S405). Expression (7) shows an example of how to set the parameter (u, v, w).

Expression 7

$$1 = \frac{L-1}{N4}$$
$$t2 = \frac{J-1}{N2 \times N3} + \frac{K-1}{N3}$$
$$t3 = \frac{I-1}{N1}$$
$$u = (1-t1) \times knotU_{k,mu+L-1} + t1 \times KnotU_{k,mu+L}$$
$$v = (1-t2) \times knotV_{mv+J-1} + t2 \times knotV_{mv+J}$$
$$w = (1-t3) \times knotW_{mw+1-1} + t3 \times knotW_{mw+1}$$
(7)

In expression (7), t1, t2, and t3 are division parameters in the section. t1 ranges from 0 to (N4−1)/(N4). t2 ranges from 0 to (N2−1)/(N2×N3)+(N3−1)/N3. t3 ranges from 0 to (N1−1)/(N1). N1, N2, N3, and N4 are the number of divisions in the section determined in steps S401 to S404. This prevents a medium tool path from being created doubly.

knotU is the u direction knot of the intermediate tool solid in expression (5), the index K is an index identifying a cross section tool path, the index L is an index identifying a parameter u direction medium tool path, and mu is the order of the parameter u direction. knotV is the v direction knot of the intermediate tool solid in expression (5), the index J is an index identifying a parameter v direction medium tool path, and mv is the order of the parameter v direction. knotW is the w direction knot of the intermediate tool solid in expression (5), the index I is an index identifying a parameter w direction medium tool path, and mw is the order of the parameter w direction.

Next, the value (u, v, w) obtained in step S405 is substituted for the intermediate tool solid in expression (5) to find the position vector Vp and the direction vector Vd of the medium tool path. This sets the direction vector of the ith (1≦i≦N) stage medium tool path into the direction defined by dividing into (i:N+1−i) the interval between the first tool path position vector and the second tool path position vector. After executing this processing, step S55 is terminated.

The description is continued by returning to FIG. 1. The computer 50 converts the position vector Vp and the direction vector Vd of the medium tool path, which is calculated as described above, into the data structure including at least the data structure shown in FIG. 2 and stores the converted result in the file 60 (S56).

Executing steps S51 to S56 as described above create medium tool paths.

In this embodiment, rough cutting with 4-or-more axis medium tool paths is possible using the first tool path and the second tool path. This rough cutting, which is done with four-or-more axis rough cutting paths, reduces the rest of cutting and increases the cutting feed rate. In addition, because the multi axis CAM is used only for creating the first tool path and the second tool path, the use of the multi axis CAM may be reduced.

Next, with reference to FIGS. 7–9, a second embodiment will be described.

Figure 7:
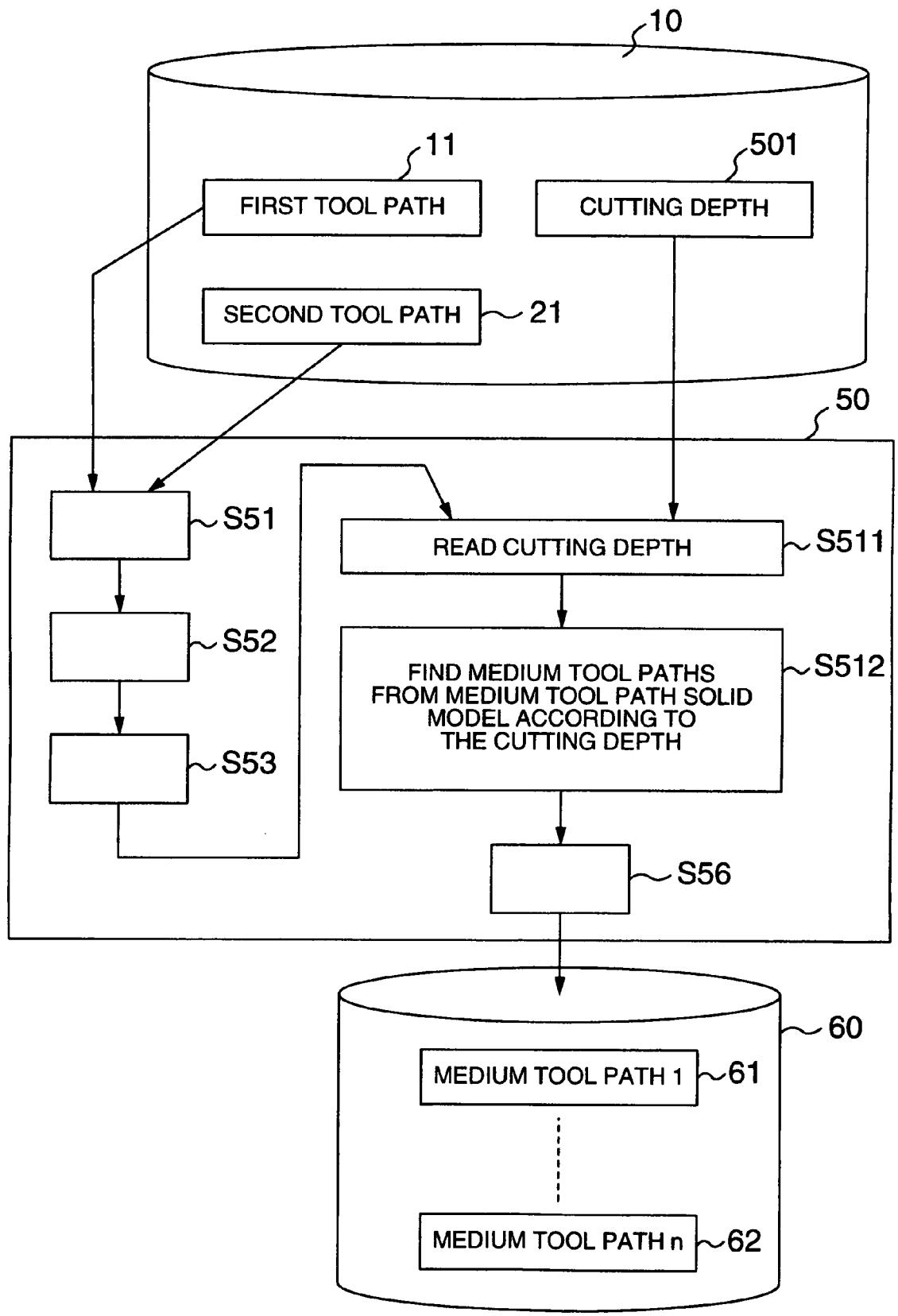
FIG. 7 is a block diagram showing the configuration of a tool path creation apparatus in a second embodiment of the present invention.

FIG. 7 is a block diagram showing the outline processing of a tool path creation apparatus in the second embodiment of the present invention. The host computer stores, not the number of divisions 31 shown in FIG. 1, but a cutting depth 501 shown in FIG. 7, into the file 10. The computer 50 in this embodiment executes steps S51–S53 and reads the cutting depth 501 from the file 10 (S511). The computer 50 finds the medium tool paths from the medium tool path solid model according to the cutting depth 501 (S512). After that, the computer 50 executes step S56 and stores the n medium tool paths 61 in the file 60.

Figure 8:
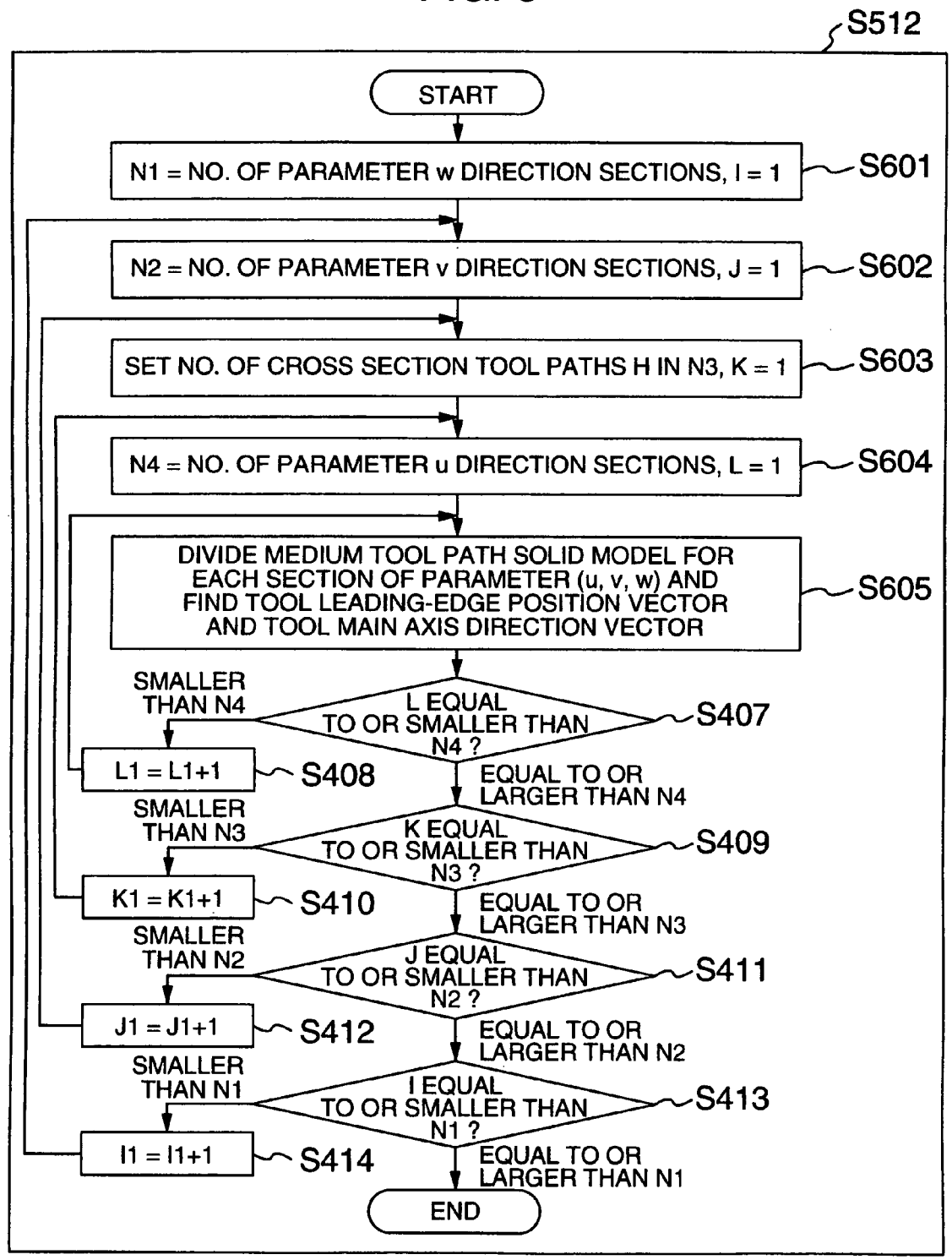
FIG. 8 is a flowchart showing an example of processing in which medium tool path data is obtained from a medium tool path solid model according to a cutting depth.

FIG. 8 is a flowchart showing an example of step S512. Because the description of FIG. 8 overlaps that of FIG. 6, only the differing part of the flowchart is described below.

Step S401 in FIG. 6 is replaced by step S601 in which the number of parameter w direction sections, which is taken out, is set in N1 and the index I identifying a parameter w direction section is set to 1. Step S402 is replaced by step S602 in which the number of parameter v direction sections, which is taken out, is set in N2 and the index J identifying a parameter v direction section is set to 1. Step S404 is replaced by step S604 in which the number of parameter u direction sections, which is taken out, is set in N4. Steps S405 and S406 are replaced by step S605 in which the intermediate tool solid is divided for each section of the parameter (u, v, w) to find the position vector Vp and the direction vector Vd. Sequentially executing the steps described above finds medium tool paths corresponding to the cutting depth.

Figure 9:
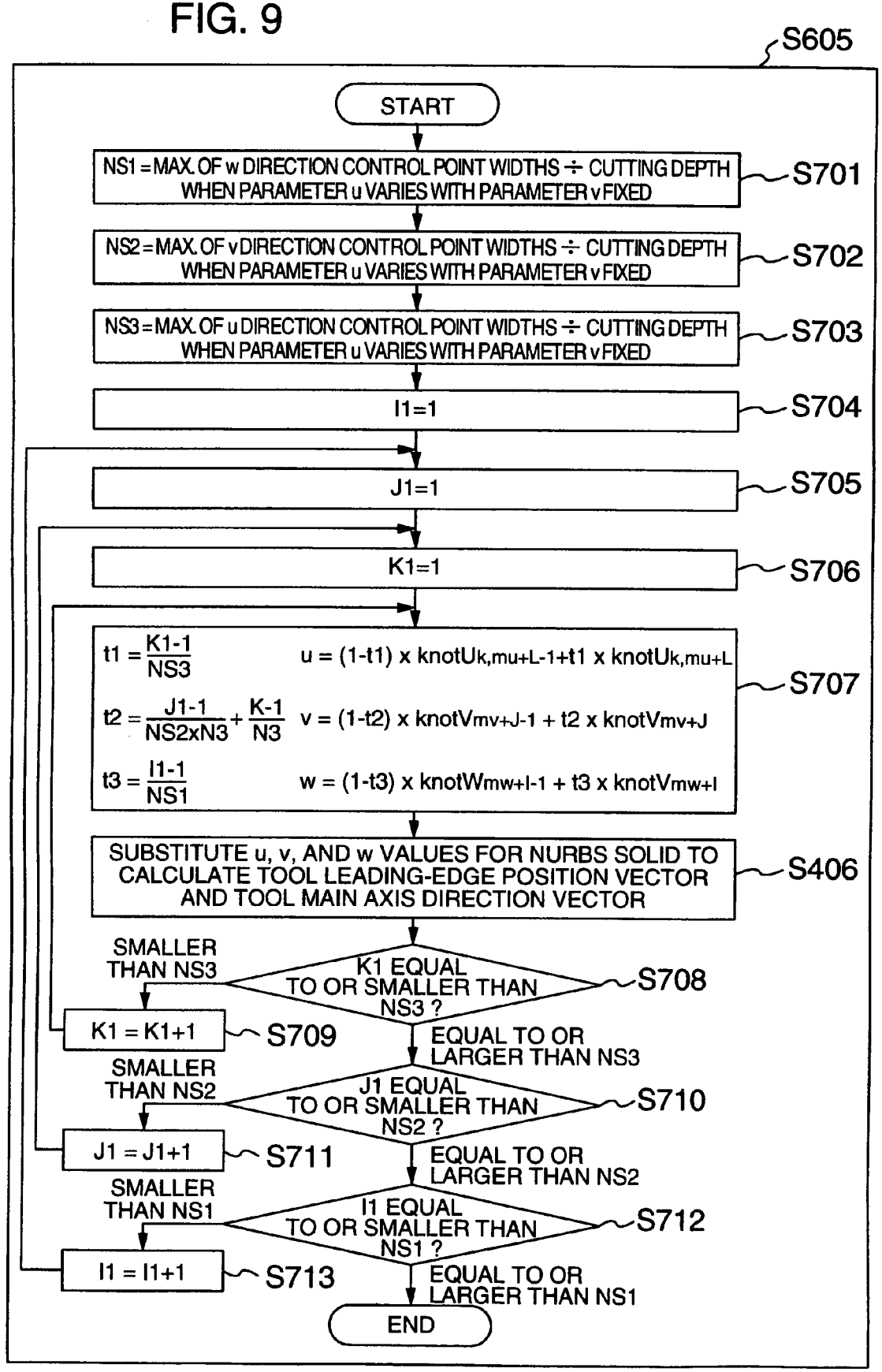
FIG. 9 is a flowchart showing an example in which a position vector and a direction vector are obtained by dividing processing into parameter sections.

FIG. 9 is a flowchart showing an example of executing step S605.

First, with the parameter v of the intermediate tool solid fixed to (I−1)/(N1−1), the parameter u of the intermediate tool solid is sequentially changed from 0 to (L−1)/(N4−1) to create w direction control point widths (S701). From those control point widths, the maximum interval value is taken out. This maximum value is the maximum thickness of the medium tool path solid model. Then, the maximum thickness is divided by the cutting depth to calculate the number of divisions in the w direction, and the resulting value is stored in NS1. Using this number of divisions, the medium tool paths, whose depth is not greater than the cutting depth, may be created in the w direction.

As in step S701, v direction control point widths are created and the maximum interval value is taken out (S702). This maximum value is the maximum depth of the medium tool path solid model. Then, the maximum depth is divided by the cutting depth to calculate the number of divisions in the v direction and the resulting value is stored in NS2. Using this number of divisions, the medium tool paths, whose depth is not greater than the cutting depth, may be created in the v direction.

As in step S701, u direction control point widths are created and the maximum interval value is taken out (S703). This maximum value is the maximum width of the medium tool path solid model. Then, the maximum width is divided by the cutting depth to calculate the number of divisions in the u direction and the resulting value is stored in NS3. Using this number of divisions, the medium tool paths, whose depth is not greater than the cutting depth, may be created in the u direction.

Next, the index I1 identifying the number of medium tool paths in the w direction is set to 1 (S704). After executing steps S705–S711, a check is made if the index I1 is smaller than NS1 (S712). If the index I1 is smaller than NS1, the index I1 is incremented by one and control is passed to step S705 to repeat processing (S713). If I1 is equal to or larger than NS1, processing ends. Executing the above steps create medium tool paths divided in the w direction.

Next, the index J1 identifying the number of medium tool paths in the v direction is set to 1 (S705). After executing steps S706–S709, a check is made if the index J1 is smaller than NS2 (S710). If the index I1 is smaller than NS2, the index J1 is incremented by one and control is passed to step S705 to repeat processing (S711). If J1 is equal to or larger than NS2, control is passed to step S712. Executing the above steps create medium tool paths divided in the v direction.

Next, the index K1 identifying the number of medium tool paths in the u direction is set to 1 (S706). After executing steps S707 and S406, a check is made if the index K1 is smaller than NS3 (S708). If the index K1 is smaller than NS3, the index K1 is incremented by one and control is passed to step S707 to repeat processing (S709). If K1 is equal to or larger than NS3, control is passed to step S710. Executing the above steps create medium tool paths divided in the u direction.

In step S707, the parameter (u, v, w) of expression (5) is created. Expression (8) shows an example of how to set the parameter (u, v, w).

Expression 8

$$\left.\begin{aligned} t1 &= \frac{K1-1}{NS3} \\ t2 &= \frac{J1-1}{NS2 \times N3} + \frac{K-1}{N3} \\ t3 &= \frac{I1-1}{NS1} \\ u &= (1-t1) \times knotU_{k,mu+L-1} + t1 \times knotU_{k,mu+L} \\ v &= (1-t2) \times knotV_{mv+J-1} + t2 \times knotV_{mv+J} \\ w &= (1-t3) \times knotW_{mw+1-1} + t3 \times knotW_{mw+1} \end{aligned}\right\} \quad (8)$$

In expression (8), t1, t2, and t3 are division parameters in the parameter u, v, and w directions. t1 ranges from 0 to (NS3−1)/NS3. t2 ranges from 0 to (NS2−1)/(NS2×N3)+(J−1)/N3. t3 ranges from 0 to (NS1−1)/NS1. NS1, NS2, and NS3 are the number of divisions in the section in the parameter u, v, and w directions. This prevents a medium tool path from being created doubly. Other variables are the same as those included in the description of expression (7).

In step S406, the value (u, v, w) obtained in step S707 is substituted for the medium tool path solid model in expression (5) to find the position vector Vp and the direction vector Vd of the medium tool path. After executing the above processing, step S605 ends.

In this embodiment, because the medium tool path is obtained from the medium tool path solid model according to the cutting depth, the cut amount of the tool may be controlled so that it does not exceed the cutting depth.

The cutting depth may also be set individually for the width direction, depth direction, and height direction of the medium tool path solid model. To do so, the cutting depth in steps S701–S703 in FIG. 9 is changed individually for the width direction, depth direction, and height direction. This makes it possible, for example, to decrease the cut amount in the height direction and to increase the cut amount in the depth direction.

Figure 14:
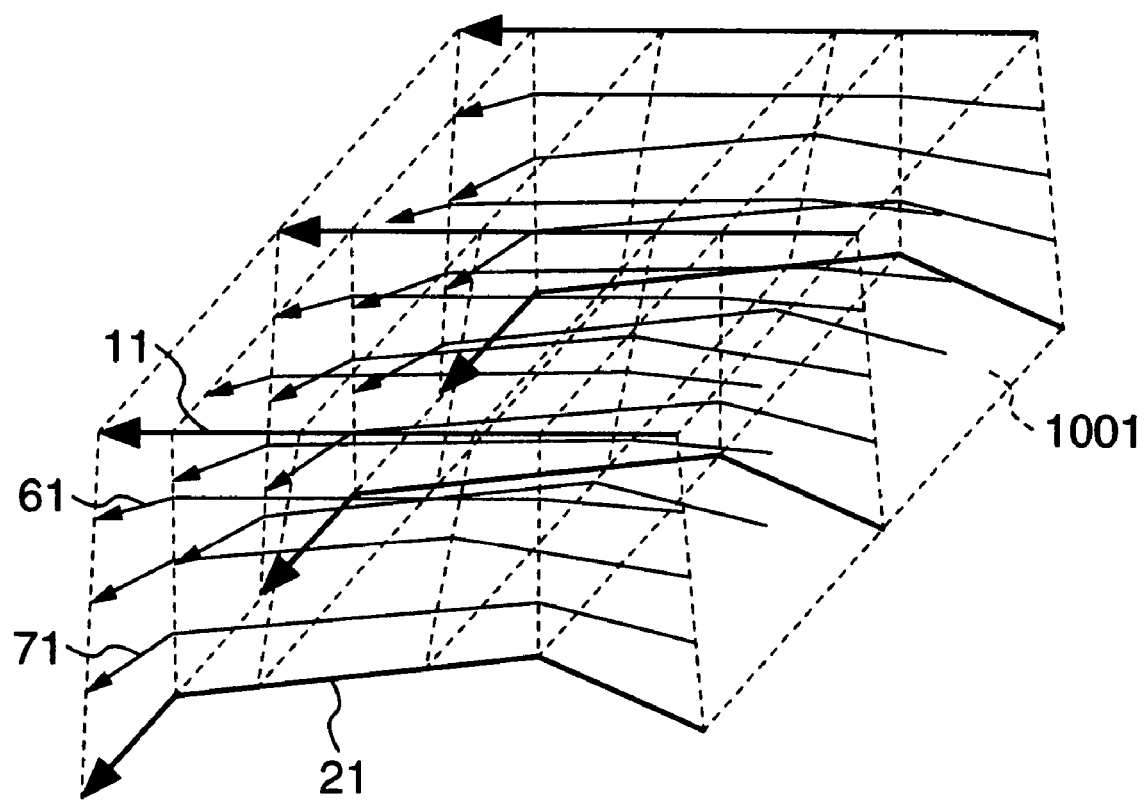
FIG. 14 is a diagram showing an example of display of medium tool paths and cross section tool paths.

FIG. 14 shows an example in which the polygonal lines created by joining the position vectors from the medium tool paths created as described above. For simplicity, FIG. 14 does not show the direction vectors.

As shown in the figure, a medium tool path solid model 1001 is created between the first tool path (cross section tool path) 11 and the second tool path (cross section tool path) 21. (Number of divisions −1) (n−1) medium tool paths 61 are created from the medium tool path solid model 1001. The figure also indicates that the first tool path (cross section tool path) 11, second tool path (cross section tool path) 21, and medium tool path 61 all have the same number of points.

Figure 15:
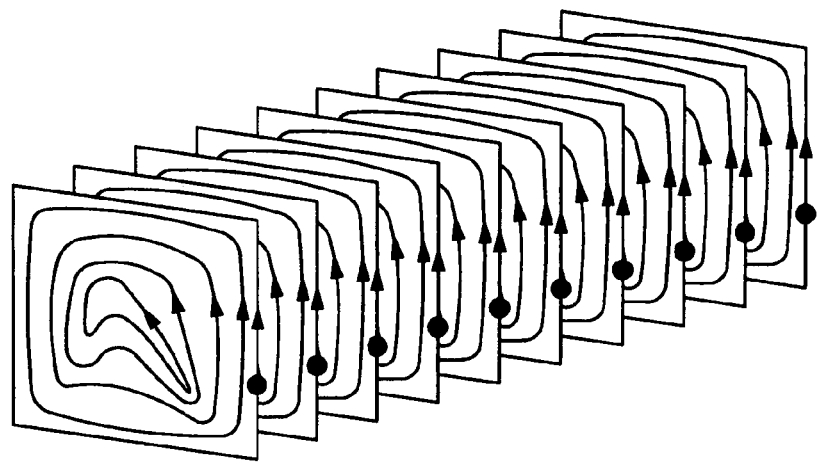
FIG. 15 is a diagram showing an example of the display of go-around medium tool paths.

FIG. 15 shows an example of round type medium tool paths created in this way. In FIG. 15, the direction vectors are omitted.

Figure 16:
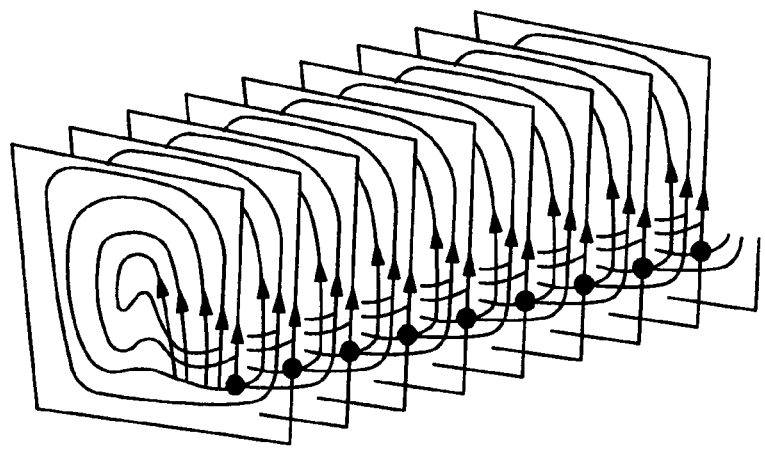
FIG. 16 is a diagram showing an example of the display of screw type medium tool paths.

In addition, by specifying t2=t1+(K−1)/N3 for expression (7) in step S405 in FIG. 6 or for expression (8) in step S707 in FIG. 9 respectively, screw type medium tool paths may be created in the direction that intersects with the cutting path. This is because the parameter v changes in the same way the parameter u changes. FIG. 16 shows an example of screw type medium tool paths. In FIG. 16, the direction vectors are omitted.

Figure 17:
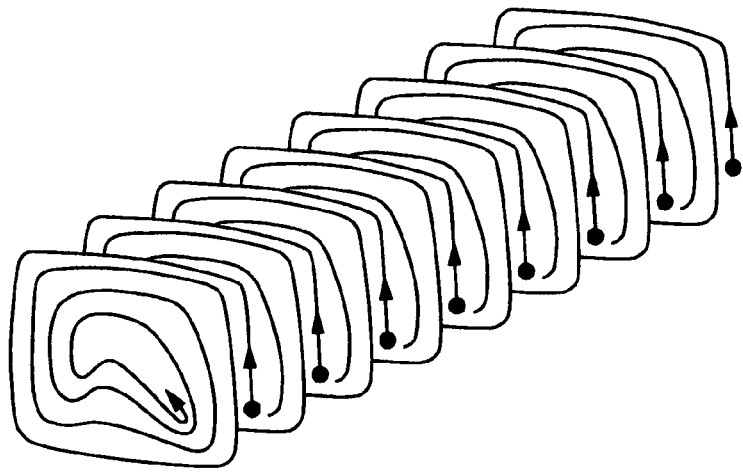
FIG. 17 is a diagram showing an example of the display of spiral type medium tool paths.

Alternatively, t3=(t1+(K−1)/N3)/NS1+(I1−1)/NS1, if specified, creates spiral type medium tool paths in the direction from the first tool path to the second tool path. This is because the parameter w changes in the same way the parameter u changes. FIG. 17 shows an example of spiral type medium tool paths. In FIG. 17, the direction vectors are omitted.

Next, with reference to FIGS. 10–13, a third embodiment of the present invention will be described. This embodiment relates to a service that generates tool path data using the tool path data generation system described above and provides the generated tool path data.

Figure 10:
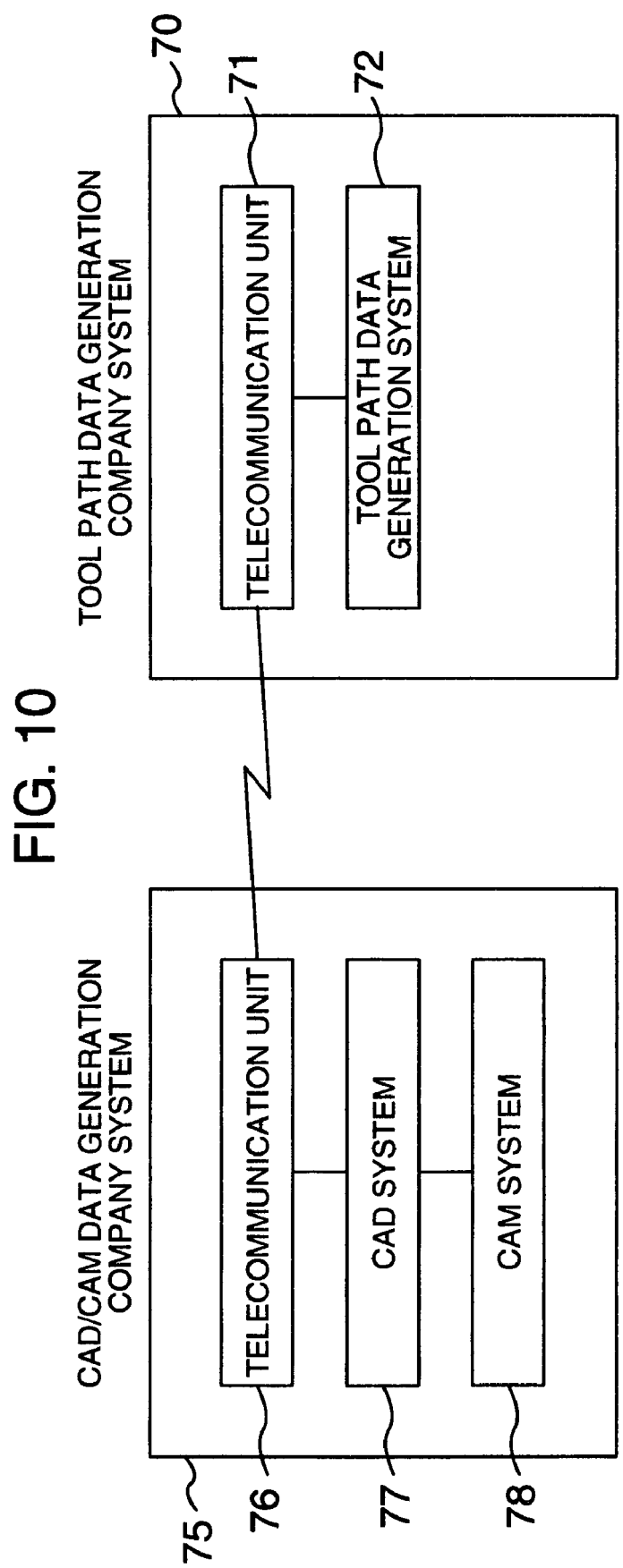
FIG. 10 is a diagram showing the overview of a tool path data generation service system.

FIG. 10 is a diagram showing the overview of the service system that provides the tool path data generation service. This service system comprises a tool path data generation company system 70 and a CAD/CAM data generation company system 75.

The tool path data generation company system 70 comprises a telecommunication unit 71 that communicates with the CAD/CAM data generation company, which is a customer of the service, and a tool path data generation system 72.

The CAD/CAM data generation company system 75 comprises a telecommunication unit 76 that communicates with the tool path data generation company, a CAD system 77 that generates CAD data and tool path data via the telecommunication unit, and a CAM system 78.

The following describes the service that the tool path data generation company provides to the CAD/CAM data generation company. In the following description, the CAD/CAM data generation company includes makers that not only generate tool path data but also manufacture products using tool path data.

The tool path data generation system 72 of the tool path data generation company system 70 receives tool path data and number-of-divisions or cutting depth data from the CAD/CAM data generation company system 75, which is a customer, via the telecommunication units 76 and 71. The tool path data includes at least position vector data and direction vector data. It is required that the tool engage data, cutting data, and retract data included in the cross section tool path data 121 (see FIG. 2) be distinguishable. It is also required that the first tool path and the second tool path be distinguishable because the tool path data generation system 72 requires a tool path for rough cutting a work and a tool path for cutting into a finishing shape.

The tool path data generation system 72 calculates medium tool path data from the received data. The calculated medium tool path data is returned to the CAD/CAM data generation company system 75.

The CAD/CAM data generation company, which receives the tool path data generation service described above, can do multi axis cutting. This results in minimized tool wear-out and good quality cutting. In addition, because there is no need for the CAD system to generate shape data for rough cutting and for the CAM system to generate medium tool path data for each unit of shape data, the working hour required in the CAD system for generating shape data or in the CAD system for generating the medium tool path data is reduced.

An individual monitor unit 32, monitor information output unit 33, monitor information detection unit 34, and centralized monitor unit 10 are each configured, for example, by a general-purpose computer system. The components and the functions in the units 32, 33, 34, and 10, which will be described below, are implemented by executing computer programs.

Figure 11:
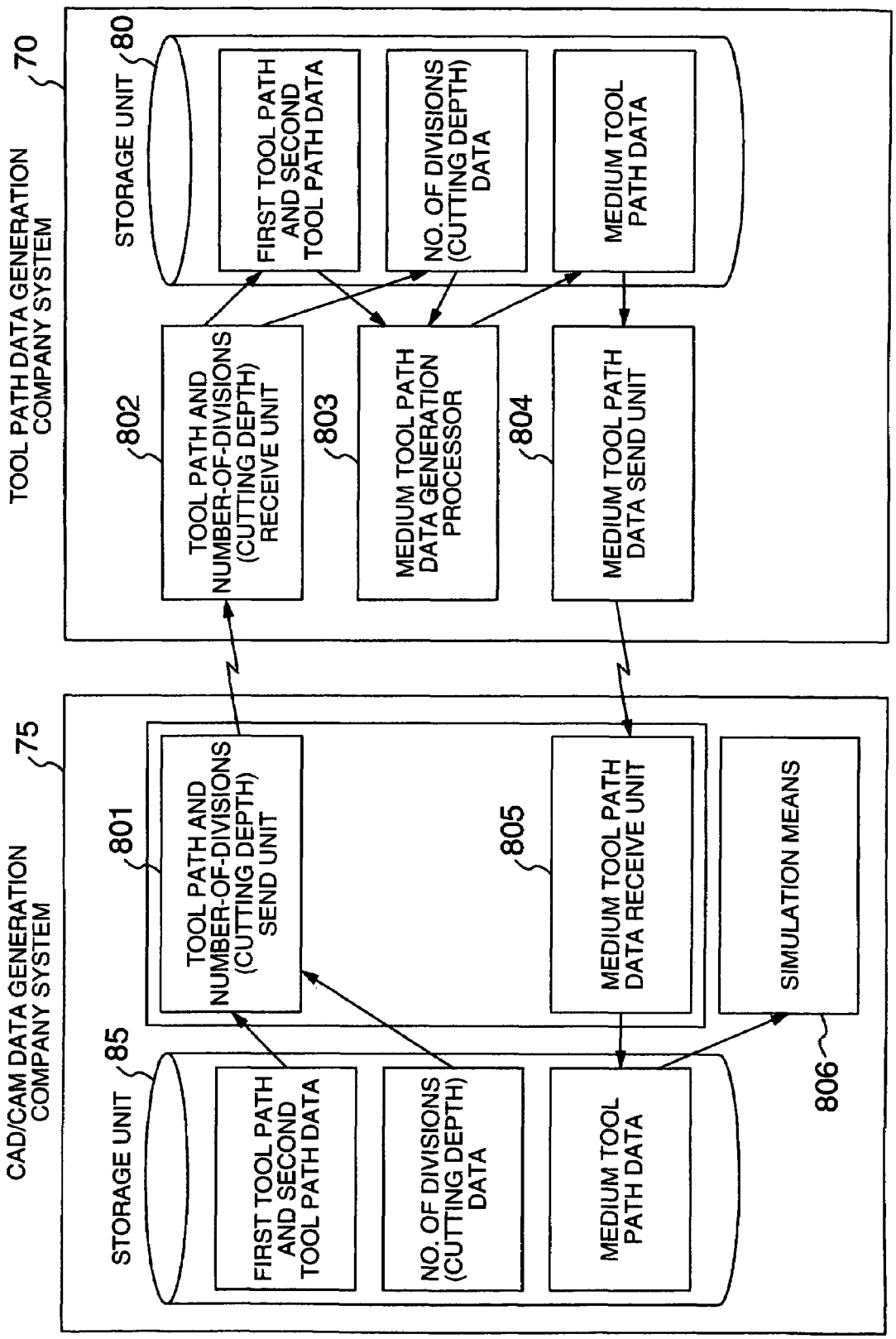
FIG. 11 is a diagram showing the overview of the systems of the tool path data generation service.

Next, FIG. 11 shows an example of the system configuration of a tool path data generation service system. The CAD/CAM data generation company system 75 comprises a tool path and number-of-divisions (cutting depth) send unit 801, medium tool path data receive unit 805, simulation means 806, and storage unit 85.

The tool path and number-of-divisions (cutting depth) send unit 801 transmits first and second tool path data 851 and number-of-divisions or cutting depth data 852, which are stored in the storage unit 85, to the tool path data generation company system 70.

The tool path data generation company system 70 comprises a tool path and number-of-divisions (cutting depth) receive unit 802, medium tool path data generation processor 803, medium tool path data send unit 804, and storage unit 80.

The tool path and number-of-divisions (cutting depth) receive unit 802 receives first and second tool path data and number-of-divisions (cutting depth) data and stores them in the storage unit 80. The medium tool path data generation processor 803 reads the first and second tool path data and the number-of-divisions (cutting depth) data from the storage unit 80 and generates medium tool path data. The generated medium tool path data is stored in the storage unit 80. The medium tool path data send unit 804 reads the medium tool path data from the storage unit 80 and transmits it to the CAD/CAM data generation company system 75.

The medium tool path data receive unit 805 of the CAD/CAM data generation company system 75 receives the medium tool path data and stores it in the storage unit 85. The simulation means 806 performs tool cutting simulation using the medium tool path data and displays the result on a display unit not shown.

Figure 12:
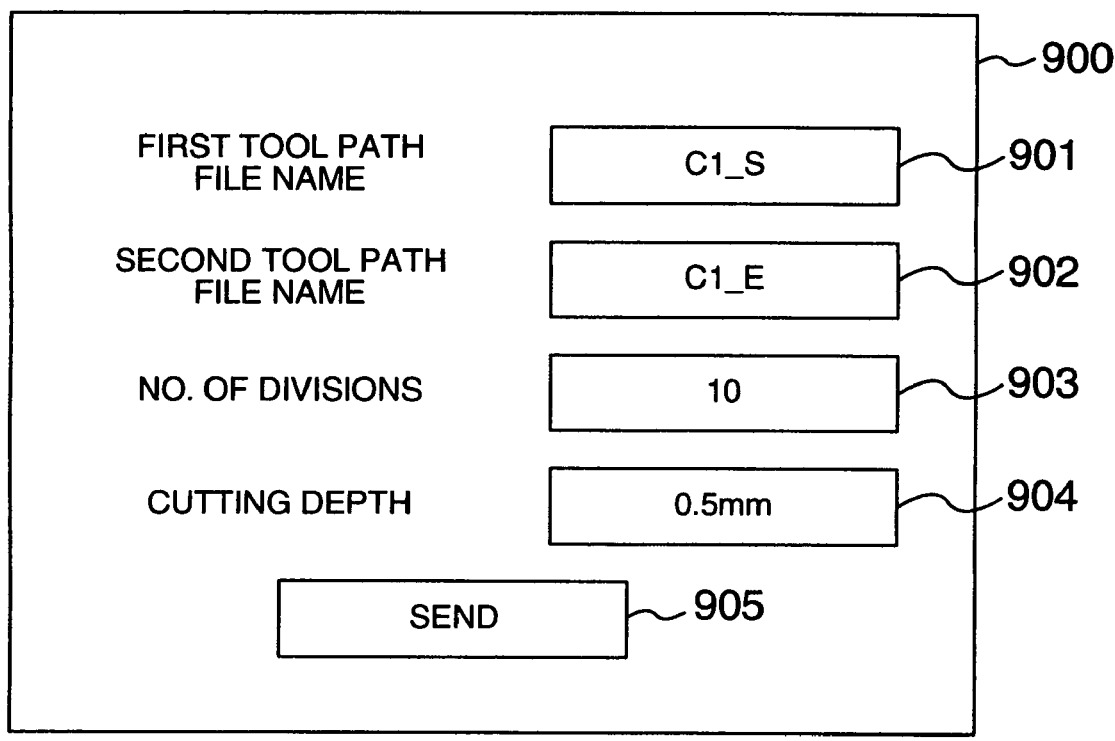
FIG. 12 is a diagram showing an example of an operation screen 900 provided by a send unit 801.
Figure 13:
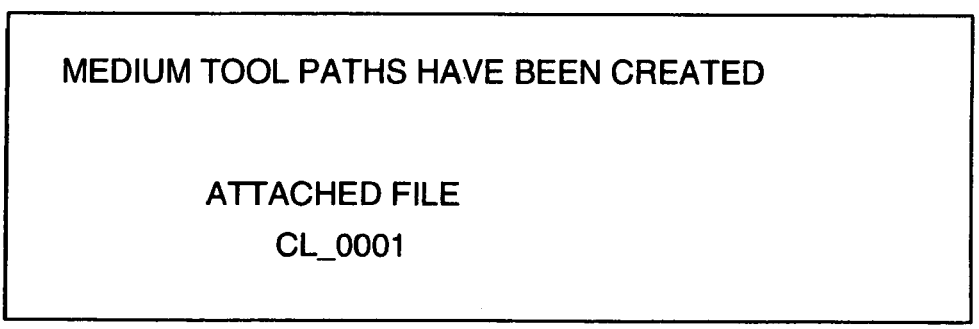
FIG. 13 is a diagram showing an example of a received mail.

FIGS. 12 and 13 show an example of the operation of a computer system comprising the tool path and number-of-divisions (cutting depth) send unit 801, medium tool path data receive unit 805, and simulation means 806. The tool path and number-of-divisions (cutting depth) send unit 801 executes its function by transmitting data, for example, from a WWW web page.

FIG. 12 shows an example of an operation screen 900 provided by the tool path and number-of-divisions (cutting depth) send unit 801. From an input unit not shown, the user enters a first tool path file name into a file name input dialog 901, a second tool path file name into a file name input dialog 902, a number-of-division into a number-of-divisions dialog 903, and a cutting depth into a cutting depth dialog 904 that are displayed on the operation screen 900 and then presses a Send button 905. If a number-of-divisions is entered into the number-of-divisions dialog 903, the cutting depth data becomes invalid; if data is entered into the cutting depth dialog 904, number-of-divisions data becomes invalid.

Although first tool path data, second tool path data, number-of-division data, and cutting depth data are stored in separate files in FIG. 12, they may be stored in one file.

Communication between the tool path data generation company system 70 and the CAD/CAM data generation company system 75 is done, for example, by uploading and downloading a file or by sending and receiving electronic mails.

FIG. 13 shows an example in which the medium tool path data receive unit 805 receives a mail. In this example, the text indicating that the medium tool path data has been normally generated is displayed and the medium tool path data is sent as an attached file. The simulation means 806 reads the attached file from the mail shown in FIG. 13 using a file read command, executes simulation, and displays the cutting simulation result.

According to the tool path data creation apparatus in the embodiments described above, medium tool paths for rough cutting may be easily created using the tool paths created with multi axis CAM. Therefore, the working hour required for tool path creation with CAM may be reduced. Furthermore, the ability to create four-or-more axis tool paths allows a tool having a corner with a radius to be tilted for cutting, making it possible to increase the cutting amount and to increase the cutting speed.

Another advantage is that a cutting depth may be set instead of a number of divisions. This allows tool paths to be created according to the tool cutting specification, thus minimizing wear-out caused by a cutting load fluctuation and ensuring good-quality cutting.

Moreover, the ability to create screw type medium tool paths in the direction intersecting with the cutting path and to create spiral type medium tool paths in the direction from the first tool path to the second tool path enables the tool-loaded state to be prolonged. This reduces the wear-out of tools and, at the same time, ensures good-quality cutting.

It is to be understood that the embodiments described above are for illustrative only and that the scope of the present invention is not limited to those embodiments. Those skilled in the art may practice the present invention in other various forms without departing the spirit of the present invention.

One of the effects of the present invention is to create, from two tool paths, other tool paths for accurately and efficiently cutting works.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A tool path creation method performed by a computer program embodied on a computer-readable medium comprising the steps of:

reading cutting path data as tool path information necessary for performing a cutting operation by a tool, in accordance with both first tool path information defining a position and a direction of a tool used for cutting a material and second tool path information defining a position and a direction of the tool when used for subsequently cutting the material after a cutting operation along the first tool path;

preparing a medium tool path in a u-direction which is a cutting path direction vector in the first tool path information identical with another position and direction vector in the second tool path information;

further preparing a medium tool path in a v-direction which is a direction toward a succeeding cutting path between the first tool path and the second tool path;

still further preparing a medium tool path in a w-direction which is a direction from the first tool path to the second tool path;

calculating a medium tool solid having a position vector and a direction vector defined by a set of medium tool paths in each of the u-direction, the v-direction and the w-direction tool path;

further calculating a set of third tool paths between the first tool path and the second tool path; and sequentially cutting the material according to the first tool path, the third tool path and the second tool path.

2. A computer program for preparing a tool path embodied on a computer-readable medium comprising the steps of:

obtaining cutting path data in accordance with both first tool path information defining a position and a direction of a tool used for cutting a material with the tool and second tool path information defining a position and a direction of the tool when used for subsequently cutting the material after a cutting operation along the first tool path;

preparing a medium tool path in a u-direction which is a cutting path direction by making position and direction vectors in the first tool path information identical with position and direction vectors in the second tool path information;

further preparing a medium tool path in a v-direction which is a direction toward a succeeding cutting path between the first tool path and the second tool path;

still further preparing a medium tool path in a w-direction which is a direction from the first tool path to the second tool path;

calculating a medium tool solid having a position vector and a direction vector defined by a set of medium tool paths in each of the u-direction, the v-direction and the w-direction tool path;

further calculating a set of third tool paths between the first tool path and the second tool path; and sequentially cutting a material according to the first tool path, the third tool path and the second tool path.

3. A tool path preparing device comprising:

a first unit for obtaining cutting path data in accordance with both a first tool path information defining a position and a direction of a tool used for cutting a material using the tool and a second tool path information defining a position and a direction of the tool when used for subsequently cutting the material after a cutting operation along the first tool path;

a second unit for preparing a medium tool path in a u-direction which is a cutting path direction by making position and direction vectors in the first tool path information identical with position and direction vectors in the second tool path information;

a third unit for further preparing a medium tool path in a v-direction which is a direction toward a succeeding cutting path between the first tool path and the second tool path;

a fourth unit for still further preparing a medium tool path in a w-direction which is a direction from the first tool path to the second tool path;

a fifth unit for calculating a medium tool solid having a position vector and a direction vector defined by a set of medium tool paths in each of the u-direction, the v-direction and the w-direction tool path;

a sixth unit for further calculating a set of third tool paths between the first tool path and the second tool path; and a seventh unit for sequentially cutting a material according to the first tool path, the third tool path and the second tool path.

* * * * *